Patented Feb. 7, 1933

1,896,583

UNITED STATES PATENT OFFICE

CHARLES O. HOOVER, OF SAN ANTONIO, TEXAS

PROCESS OF REMOVING ACID SLUDGE FROM VISCOUS HYDROCARBON OIL

No Drawing. Application filed October 28, 1929. Serial No. 403,129.

This invention relates to the process of removing impurities, such as acids and tarry ingredients and the dark-colored constituents thereof, from oils, then decolorizing said oils; and, albeit my process is intended for the treatment of all types of oils, it is adapted for use more particularly with petroleum oils, and it has for its objects a saving in labor, a saving in time, a saving in materials to be used, a saving in fuel, and, therefore, a saving in cost; and, further, to doing away with the disadvantages incident to methods that are in use now.

I shall refer first to the methods that are in use now.

The ordinary, so-called "sulphuric-acid-treatment" of oils consists in placing an oil that is to be treated in a suitable container, then adding to said oil a suitable quantity of sulphuric acid at a temperature of from eighty degrees to one hundred and sixty degrees Fahrenheit. A temporary emulsion of the oil and the acid is formed by agitation, either by means of a mechanical agitator or by a current of air made to issue from an airpipe at or else near the bottom of the container. Agitation is continued until the sulphuric acid in the mixture has become largely spent. Acid tar (which is commonly known in the art as "acid sludge") then floats in the oil. Coarser particles soon settle to the bottom of the container from which they may be drawn off by means of a suitable cock. The finer particles (which are commonly known in the art as "pepper sludge") settle very slowly, particularly in heavy and viscous oils; and, even if it were possible to effect a complete separation, it would not be commercially feasible to do so inasmuch as weeks of time would be required. Practice has shown, moreover, that acid tar ("sludge"), sulphuric acid and sulphureted oils must be removed from contact with the oil as soon as possible, the sooner the better because acid tar is a deeply-colored substance possessing a high tinctorial value, and resolution of such tar seriously affects the color of an oil.

At this stage of procedure in the method referred to, one is confronted by a choice of two methods of refining the oil. The two methods follow numbered "1" and "2".

1. When it has been decided that the acid has become spent, water is added to the acid oil and agitation thereof is continued until the acid tar particles increase no longer in size; then agitation is ceased and the acid tar particles are permitteed to settle insofar as they can and will settle whereupon the acid tar is drawn off or else the partially detarred oil is decanted from the acid tar, then such acid reaction products as may remain are neutralized with a caustic soda solution or some other neutralizing agent and the remaining neutralizing agent or its products are washed out with water. Inasmuch as much of the color improvement obtained by the action of the sulphuric acid on the oil is lost during the neutralizing stage of this method, the oil must be subjected further to a decolorizing treatment, either by percolation or by contact with some bleaching clay or fuller's earth.

Here are some of the disadvantages of the method just described:

A comparatively large quantity of free sulphuric acid is mechanically suspended in the oil, hence a proportionate volume of costly sodium hydroxide solution becomes necessary to neutralize the acid and thus there is formed a strong sodium sulphate solution which often will salt out the soapy bodies. The resulting mass has the consistency of soft soap and thus there is formed the most resistant of emulsions, particularly if the oil be viscous and the proportion of sodium salts in the oil be large. Efficient though they are in forming emulsions, these agents cause the wash water to settle out slowly and while so settling out to entrain and carry away no inconsiderable quantity of the oil itself. This cause of loss alone (proved in practice to be about eight per cent of the charge) makes this method costly; furthermore, when this method is employed, the acid tar is very likely to be hard and cokey. Moreover, the finely divided acid tar ("pepper") that remains in the oil will possess a high content of sulphuric acid, and in such condition the acid tar will be insoluble; and, although it may be made soluble therein upon neutralization of its acid content, the oil becomes darkened by the resolution of the tars and the commercial value of the oil will in consequence be reduced.

2. When, in employing this method, it has been decided that the acid has spent its store of energy, agitation is discontinued and the acid oil is permitted to rest while the coarser particles of acid tar settle and are withdrawn, thus leaving suspended in the oil the finer particles ("pepper") together with free sulphuric acid which is held mechanically, sulfonic acids and alkyl sulphuric acids. The acid oil is then in condition for final treatment which consists in admixing a finely divided clay, fuller's earth, montmorillonite, infusorial earth, or some similar substance, then heating the oil with the admixed clay and filtering by any of the well-known methods of separating oil and finely divided clay.

To use of the second method there are these outstanding disadvantages:

Notwithstanding the importance of eliminating acid tars, complete elimination of this harmful element is impossible. Even when only a small quantity of acid tar remains in the oil after treatment by sulphuric acid, that quantity will prove a very serious hindrance in the finishing of the oil because such tars decompose at increased temperatures and thus not only darken an oil but require a large quantity (frequently up to 5 to 15%) of clay. Thus cost is increased, market value is reduced, and a stable or permanent color of oil may not be had. Adding a decolorizing clay to the oil, then heating the two will not completely neutralize the acid and acid compounds in the oil; and when the oil is stored, the color will go bad and an unpleasant odor will develop in the oil.

All these objections may be overcome by the use of my improved process.

My process provides for treatment of an oil with the required volume of sulphuric acid in the customary manner up to making an addition of water; then, instead of adding water, I add a finely divided clay, fuller's earth, montmorillonite, infusorial earth, silicagel, or some similar substance (either in a raw state or after it has been treated by any of the known processes that increase the absorbent properties of such substances) mixed with some finely divided alkali, such as calcium carbonate, calcium hydroxide, sodium salts, et cetera (the calcium carbonate being preferred). At this stage, no particular control of temperature is needed. The oil may be at about ordinary atmospheric temperature, or higher or lower. It will frequency be observed that the sulphuric acid treatment has caused the oil to become slightly warm. After the said reagent has been added (or before this if desired) the oil may be warmed up, as is common in the art, if desired. The proportion of fuller's earth or other clay should be about fifty per cent of the mixture and so also should be the proportion of alkaline earth used; or, when magnesia in any of its basic compounds be added, the proportions of the mixture should be fifty per cent of the fuller's earth or other clay, twenty-five per cent of the alkaline earth, and twenty-five per cent of the magnesia. From one-half a pound to five pounds of the mixture may be added per barrel of oil when the sulphuric acid has spent its store of energy and, as the agitation is continued, all of the acid tar will gather in large grains and even in large chunks, and when the agitation is ceased all of these grains and chunks will settle rapidly and leave an acid tar free oil. When preferred, agitation may be discontinued, the large grains of tar that settle may be withdrawn, then the finely ground mixture referred to above may be added to the oil and the two agitated until the fine tar ("pepper") agglomerates. My preference, however, is for the process that I stated first. The acid tar is then smooth and soft and, being so, may be removed from the container easily. Now, although freed of acid tar, the oil contains free sulphuric acid and sulphuric acid compounds and this condition is most desirable for contact bleaching inasmuch as a large majority of the bleaching clays are most efficient only while sulphuric acid is in the oil. The oil, however, must be tar free, and my process makes it so.

The oil, now freed of tar, is decanted to a tank or container and is mixed with just enough clay to assure the color desired in the finished oil. The percentage required is well understood by the trade. The admixture should be heated to the temperature necessary to assure maximum bleached, steam being passed into the admixture as it enters the heating unit. The bleaching oil will be found on the acid side and my process provides for neutralizing this acid by adding an alkali in its dry, powdered state. The alkaline materials that may be used are calcium carbonate (which I prefer), calcium hydroxide, magnesia salts, sodium salts, any of the alkalis, or any mixture that may consist of any two or more of them. Such materials are embraced hereinafter under the term "alkaline substance". The alkaline material should be added to the oil and clay while the mixture is hot and be agitated before conducting it to the filter press.

Or, the process that I have just described may be followed up to the point of bleaching; then, instead of bleaching, the oil may be washed with a weak alkali water solution or clear water, blown bright and decolorized by percolation.

My improved process assures an oil of superior quality and better color at much less cost in time, labor, steam, chemicals, et cetera.

Having described my invention, I claim:

1. The process of removing acid sludge from a viscous hydrocarbon oil which has been mixed with sulphuric acid during a refining operation which comprises intimately mixing with the mixture of oil and sulphuric acid, without previous substantial removal of acid sludge and without previous addition of a substantial amount of water thereto, a substantially dry mixture of an adsorbent earth and an alkali, the said alkali being used in such amount as to only partly neutralize acidic bodies, so that the oil still contains free acid, whereby the acid sludge will gather in large grains or large chunks which are smooth and soft and which will settle rapidly.

2. The process of removing acid sludge from a viscous hydrocarbon oil which has been mixed with sulphuric acid during a refining operation which comprises intimately mixing with the mixture of oil and sulphuric acid, without previous substantial removal of acid sludge and without previous addition of a substantial amount of water thereto, a substantially dry mixture of an adsorbent earth and calcium carbonate, the said calcium carbonate being used in such amount as to only partly neutralize acidic bodies, so that the oil still contains free acid, whereby the acid sludge will gather in large grains or large chunks which are smooth and soft and which will settle rapidly.

Signed at San Antonio, in the county of Bexar and State of Texas, this 24th day of October, 1929.

CHARLES O. HOOVER.